United States Patent Office 3,250,639
Patented May 10, 1966

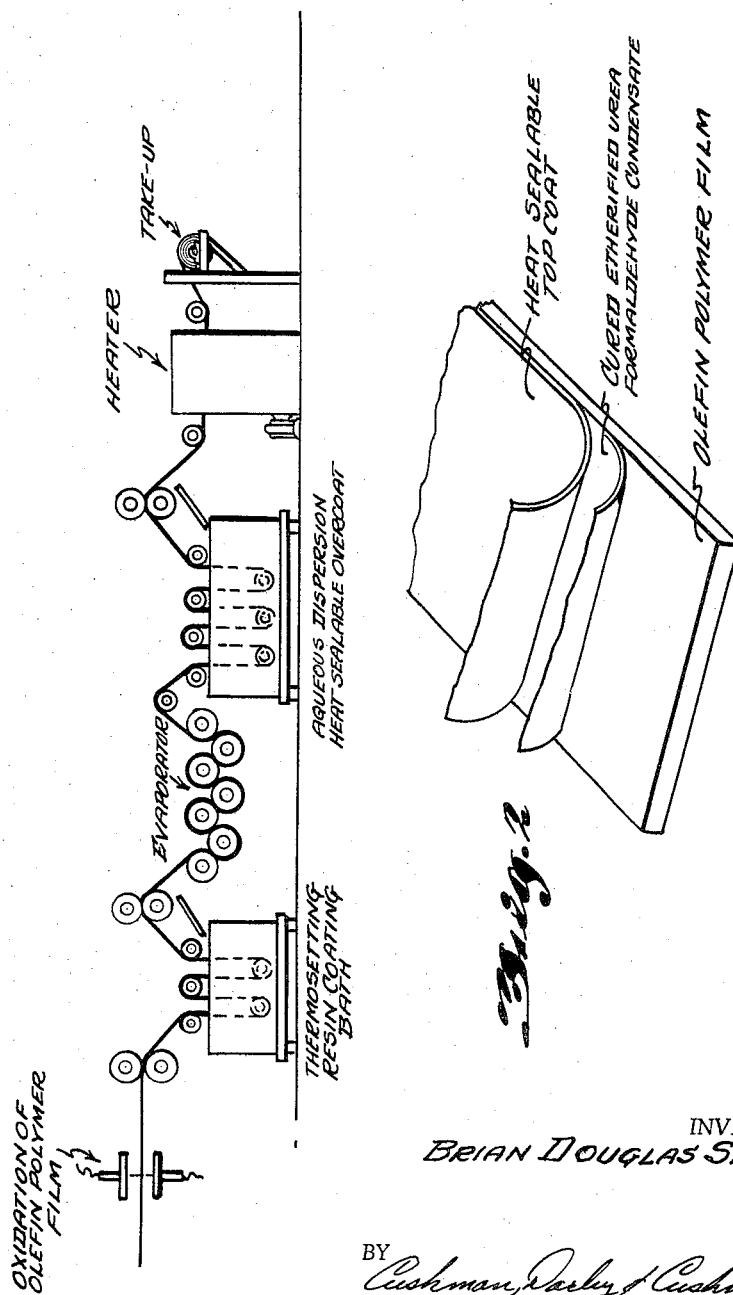

3,250,639
POLYOLEFIN FILM WITH HEAT-SEALABLE COATING AND METHOD OF COATING
Brian Douglas Stead, St. Albans, England, assignor to Imperial Chemical Industries Limited, London, England, a corporation of Great Britain
Filed May 13, 1965, Ser. No. 455,590
Claims priority, application Great Britain Feb. 8, 1961, 4,690/61; Mar. 10, 1961, 8,825/61
17 Claims. (Cl. 117—47)

This application is a continuation-in-part of Serial No. 168,817, filed January 25, 1962, and now abandoned.

This invention relates to methods for making heat seal coated self-supporting films of olefine polymers and copolymers and to the films so made.

By the term "olefine polymers" is meant polymers and copolymers of ethylene including low density, intermediate density and high density polythenes and the crystallisable polymers and copolymers of alpha-olefines having at least 3 and preferably from 3 to 6 carbon atoms in the molecule, particularly polymers and copolymers of propylene and butene-1 where the polypropylene or polybutene-1 is at least 75% insoluble in boiling n-heptane for instance, isotactic polypropylene or isotactic polybutene-1.

It is the object of the invention to provide a method for applying adherent heat seal coatings to olefine polymer or copolymer self-supporting films from aqueous dispersion.

The invention consists in a method of heat seal coating olefine polymer or copolymer films in which uncoated film is subjected to a treatment as hereinafter defined to improve the bonding properties of its surface, after which the film is coated with a dispersion of a thermosetting resin (for instance, as a solution in an organic solvent), the thermosetting resin being substantially insoluble in water and its dispersant is evaporated off. The term "dispersion" is used herein for convenience to cover the case where solutions of resin are used as well as true dispersions thereof. As will be appreciated, the film is overcoated with an aqueous dispersion of a heat-sealable coating polymer which is then dried off on the film and heated to set (or cure) the thermosetting resin so that it becomes adhesively bonded to the heat seal coating and to the base film.

The present process is illustrated in FIGURE 1 of the attached drawing. As shown, the polyolefin film is subjected to oxidation, followed by application of the thermosetting resin coating, drying, application of the heat-sealable overcoat, and heating to dry and set followed by takeup. The resulting article is shown in FIGURE 2.

The treatment by which the bonding properties of the film are improved is a chemical or physical treatment resulting in oxidation of the film surface e.g. treatment with chromic acid in sulphuric acid or with hot nitric acid; exposure of the surface to ozone e.g. while at a temperature above 100° C.; exposure of the surface to high voltage electric stress accompanied by corona discharge (such a treatment is described in British specification No. 715,914); exposure of the surface to ionising radiation such as ultra-violet, X-, $\alpha$-, $\beta$-, or $\gamma$-radiation particularly at temperatures above 100° C. so that the surface of the film becomes oxidised; and exposure of the surface to a flame for a time sufficient to cause superficial oxidation but not long enough to cause distortion of its surface. The preferred treatment because of its effectiveness and simplicity is the treatment by high voltage electric stress accompanied by corona discharge.

Where a corona discharge is used, by use of optimum conditions (that is by adjusting the frequency and voltage of the discharge and the time of the passage of the film past the electrodes to get the optimum effect) contact angles between water and the treated film down to about 50° may be obtained. The contact angle and adhesiveness are inversely correlated, in general the lower the contact angle the greater the adhesiveness. A contact angle of about 65–75° is optimum.

In this specification a thermosetting resin is defined as a fusible resin which apart from its substantial water insolubility, cures or sets to a permanently infusible form on application of heat.

Suitable thermosetting resins are the water insoluble amine-formaldehyde-thermosetting resins such as modified urea formaldehyde and melamine formaldehyde resins which are substantially water insoluble.

An amine-formaldehyde resin is defined as a resin derived from the condensation of formaldehyde with an amino-compound such as urea or melamine.

If necessary, the thermosetting resin is modified to make it substantially water insoluble and it may be prepared by etherification of an unmodified resin (or its precursor such as for instance methylol urea). For example, the unmodified resin may be etherified with an alcohol, particularly a $C_3$ to $C_6$ lower alkanol, such as propyl butanol or amyl alcohol although other lower alkanols may be used. Modifications may also be carried out by partially curing the thermosetting resin.

In one embodiment of the invention, it is preferred to use a urea-formaldehyde resin which has been etherified with an alcohol to make it substantially insoluble for instance by etherification with butanol or amyl alcohol. In this embodiment butylated urea-formaldehyde condensates are particularly preferred since they are readily available, and because they give good results.

Melamine-formaldehyde resins, particularly the alkylated forms thereof, are also highly effective especially under conditions of high temperature and high humidity.

If desired, the water-insoluble alkylated amine-formaldehyde condensation products may be prepared by reacting the amine, e.g. melamine with aqueous formaldehyde using at least 3, preferably at least 6, moles of formaldehyde per mole of amine, in the presence of the monohydric alcohol. Alternatively, the amine and formaldehyde can be reacted together first to produce a water-soluble heat-curable condensation product, which is then reacted with the monohydric alcohol. Preferably, the alcohol is used in an amount and the reaction is carried out for a sufficient period of time and at a suitable temperature which results in the etherified condensation product showing a petroleum ether tolerance of not less than 2. By the expression "petroleum ether tolerance" is meant the volume (in ml.) of petroleum ether (boiling range 100–120° C.), which when added dropwise with continuous stirring to 1 gram of a 50% solids resin solution in a 50:50 v./v. butanol/xylene mixture causes the solution to become cloudy.

The thermosetting resin may be applied as a dispersion in water, or as an alcohol/water solution, or for instance as a solution in an alcohol by itself, or in an aromatic hydrocarbon solvent such as xylene or a mixture of such solvents as is appropriate (for instance a butylated urea formaldehyde resin may be applied as a solution in butanol or in xylene butanol). It may usefully contain a plasticizer to improve the flexibility of the coating produced from it.

Unexepectedly the thermosetting resins when cured become adhesively bonded to the treated polyolefine film. A test for such bonding comprises pressing an adhesive tape against the polyolefine film which has been treated to improve the bonding properties of its surface and then coated with a thermosetting resin which is then cured; if the tape can be peeled off without easily disturbing the thermosetting resin layer the latter is considered to be adhesively bonded to the polypropylene film base for the purposes of this invention. Another test, which is consistent with the first, for such bonding is that when a heat seal is broken of such a film which has been heat seal coated, the heat seal coat does not peel off in large areas as is the case when no thermosetting resin is used.

The thermosetting resin must be substantially insoluble in water, for instance, 0.35% w./w. of (unmodified) urea formaldehyde resin in the vinylidene chloride/acrylonitrile heat seal coated copolymer used in Example 2 which was heated to a setting temperature for the resin just caused it to lose its thermoplasticity and heat sealing properties. With a .00007 inch thick heat seal coat and a 3 milligram per 100 sq. cm. resin coat this indicated a maximum permissible water solubility for this thermosetting resin of 1.1% w./w. Of course, for different resins and heat seal coats the maximum tolerable water solubility of the resin will vary but it may readily be found using a method of this type.

When the water solubility of the amine-formaldehyde anchor coating is referred to herein, it is intended to mean the water solubility after the solvent has been removed. In this connection, it is preferred to dry off the solution of the condensation product under such temperature conditions that some curing takes place at this stage but it does not go to completion since this improves the appearance of the heat-sealable copolymer coating when applied. The water solubility of the amine-formaldehyde coating before solvent removal may therefore by substantially different from that after solvent removal. It is preferred to take the curing of the condensation product substantially to completion whilst drying off the heat-sealable coating. To this end the heating may be at a temperature of 100° C. or above, e.g. 130° C., but this temperature should not be above the melting point of the base film and should not be so high that a fall-off in heat-seal strength is observed. Of course, the time and temperature to be used depends on the nature of the thermosetting resin but may easily be determined by experiments. In general, sufficient heating should be used when drying the coats to get a final coating of good appearance.

Acid catalysts may be used to help cure the condensation products. Strong involatile acids are preferred, such as citric acid and trichloro-acetic acid with sulphuric acid preferred in the case of the melamine-formaldehyde condensation products. The acid catalyst may be introduced into the condensation product before it is applied to the film or it may be allowed to diffuse into the layer of condensation product from the heat-sealable coating dispersion when this is applied. In general, sufficient heating should be used to get a final coating of good appearance, but the conditions of drying off the anchor coat or the heat-sealable coat should not be so forcing that a loss in heat-seal strength results. Of course, the optimum times and temperatures of heating used will depend on the compositions of the coatings, for instance the acid concentration of the anchor coat, but may readily be determined by experiment. In general, the temperature of drying off the anchor coat on the first coated side will be lower than that used for the second coated side as there is a tendency for the bonding properties of the pretreated (e.g. corona discharge treated) surface to be impaired if it is subjected to too high a temperature before receiving its anchor coat. It has been found that when using anchor coat drying temperatures of about 70–80° C. for the first coated side and about 110–120° C. for the second coated side, and working the process continuously at commercially acceptable drying times of a few seconds, solutions of butylated melamine-formaldehyde resins containing 2.25% of resin weight of sulphuric acid may be applied at speeds of up to about 150–200 ft./min. When the sulphuric acid content was reduced to 1.75%, however, the maximum speed that could be safely used was about 125 ft./min., otherwise the risk of spoiling the appearance of the coated film or reducing coat adhesion became undesirably great.

If the film has been oriented and will shrink at a temperature at which the coatings are dried off, means are preferably provided to prevent such shrinkage, for instance the drying and heating may be carried out in a device capable of gripping the edges of the film as it is transported longitudinally for instance in a stenter. It is then convenient to heat set an oriented film at the same time, applying the method of this invention to films which have been oriented but not heat set.

The effectiveness of the thermosetting resin coating varies with thickness; if the coating is too thin, adhesion is poor and if too thick is merely wasteful; also thinner coats can be applied to more heavily surface treated base film (e.g. treated to get lower contact angles) with similar effect. For covenience and ease of coating and economy the coating thickness is normally no greater than about 2.5 grams per square metre of base film and is preferably between 0.15 and 0.30 gram per square metre.

By a "heat-sealable" coating polymer is meant any polymer or copolymer which enables the film to which it is applied to be heat sealed using standard heat sealing equipment (see H.P. Zade, "Heat Sealing and High Frequency Welding of Plastics," Temple Press, London, 1959).

Because they give the hardest coatings and the best heat seal strengths and because of their resistance to moisture and low gas permeability, the heat-sealable coatings which are particularly preferred are the copolymers of vinylidene chloride and acrylonitrile. It is particularly preferred to use such copolymers containing between 80% and 95% by weight of vinylidene chloride and up to 20% acrylonitrile alone or in admixture with other monomers such as itaconic acid and methacrylic acid.

Other polymeric coatings which may be appiled as dispersions are polyvinyl acetate, partially hydrolysed polyvinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and another dicarboxylic acid with a glycol, e.g. those containing no more than 4.0 molecular proportions of combined terephthalic acid to one molecular portion of combined sebacic acid: copolymers of vinylidene chloride and vinyl chloride, copolymers of vinyl acetate with vinyl chloride, copolymers of vinyl acetate with ethylene and copolymers of vinyl chloride with ethylene.

The heat-sealable coating polymer may be obatined in aqueous dispersion by grinding and dispersing them in water using a suitable emulsifying agent. It is, however, preferred to prepare such dispersions by polymerizing the monomeric constituents of the heat seal coating polymer in aqueous emulsion using an emulsifying agent to keep the polymer formed in a dispersed state. It is particularly preferred to use an emulsifying agent which confers good anti-static properties on the coated film. If desired, an anti-static agent may be added to the dispersion of the seat-sealable coating polymer, for instance an anionic or a cationic emlusifying agent.

Amongst the preferred cationic surface active agents are amine and phosphonium salts, particularly salts with strong acids. Particularly useful cationic surface active agents are (a) compounds of the formula:

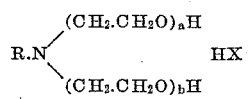

where the sum of $a$ and $b$ has a value from 2 to 5 inclusive, R is an alkyl group containing from 12 to 22 carbon atoms inclusive and X is an acid radical such as Cl; and (b) compounds in which a quaternary ammonium or phosphonium residue is attached to at least one chain of carbon atoms which may be unsaturated and which may have atoms other than carbon in the chain or substituted on to it, e.g. oxygen or nitrogen atoms. Such a chain normally contains at least 8 carbon atoms and if an alkyl chain, for convenience the alkyl group is derived from a fatty acid or fatty alcohol. The chain may be a condensate of formaldehyde or of an alkylene oxide or glycol e.g. ethylene oxide or propylene oxide. The chain may also be a polymeric residue to which one or more quaternary ammonium or phosphonium residues are attached. Among the cationic surface active agents are to be included internal salts such as betaines having a chain as above defined attached to the betaine nucleus.

Examples of specific groups of compounds which are highly effective as anti-static agents are polymers of an acrylic acid derivative in which the monomer has the formula $CH_2=C(R).CO.NH.(CH_2)_nN^+R''_3X^-$ or $$CH_2=C(R).CO.O.(CH_2)_nN^+R''_3X^-$$

and compounds having formulae $R'N^+R''_3X^-$

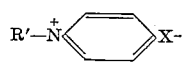

$R'.CO.NH(CH_2)_nN^+R''_3X^-$ and $$R'.CO.O.(CH_2)_nN^+R''_3X^-$$

where R is hydrogen or methyl; R' is a long chain as defined above and is preferably a $C_{10}$ to $C_{24}$ normal-alkyl or alkenyl residue e.g. palmityl, cetyl, stearyl, or oleyl or an ethylene oxide condensate having between 5 and 40 ethylene oxide residues in the chain; R'' is an alkyl or alkenyl residue which may be substituted with hydroxyl or aryl groups or it may be a long chain as set out for R', $n=1$ to 10 and $X^-$ is an anion. Compounds in which $n=3$ have been found particularly useful.

The heat-sealable coating dispersion may contain additives other than anti-static agents, for instance, anti-oxidants, dyes, pigments, lubricants, anti-blocking agents and ultra violet light stabilisers. It is particularly useful to add slip agents. These fall into two classes (a) comminuted solids which are insoluble in the heat seal coating for instance, starch, talc, zinc oxide, calcium carbonate, magnesium carbonate, diatomaceous earths such as "Superfloss," silica, kaolin, titanium dioxide, triferric tetroxide and other inorganic oxides, carbonates, silicates, aluminates and alumino-silicates and finely dispersed polymers such as polypropylene and polyvinyl chloride, the particle size of the slip agent being normally in the range 0.1–20 microns, and preferably for best effect in the range 0.2–5 microns; (b) waxy additives such as the unsaturated fatty acid amides, saturated fatty acid amides such as palmitamide, stearamide, distearamide and alkylene distearamides such as methylene and ethylene distearamide; hydroxylated fatty acid amides such as hydroxy stearamide, hydrogenated castor oil, ester type waxes, ether waxes and other hard waxes.

The coated films used in this invention may be unoriented or may be oriented in one or both directions in the plane of the film and if oriented in both directions the orientation may be equal in these directions, or unequal with the higher degree of orientation in a preferred directon (usually the longitudinal direction). The oriented films may be heat set either before or after the coating treatment.

The films of this invention whether oriented by stretching in one or both directions or not, may be used for most of the applications for which polythene, cellulose ester or polyethylene terephthalate films have been used in thicknesses between .00025 inch and .01 inch. For instance, they may be used as packaging films (oriented or non-oriented) may be used for over-wrapping, bag-making, laminating, for baleable packs and bottle cap wads. More specifically, the films may be used for general wrapping of foodstuffs particularly greasy foodstuffs, soap powders, cigars, cigarettes, pipe tobacco, cement, textiles, greased and untreated machine parts, hardware, gifts and so on; packaging of articles to be sterilised, such as medicaments, pharmaceuticals, instruments, chemicals, gauze, bandages and the like and packaging of foodstuffs which may be heated in the package and stored.

Further applications include electrical uses such as capacitor windings, transformer insulation, slot lining, electrical tapes and insulation tapes and for cable lapping.

Various other electrical applications include small coils in the form of metal laminations for telephone and radio equipment, primary insulation for heat resistant wire, split mica insulating tape, i.e. mica sheets laminated between film, small condensers for instance having metal foil laminated to film or using vacuum metallized film, weather resistant electrical wire such as a conductor wrapped with film and coated with asphalt, wrapping for submerged pipe to insulate against ground currents, and laminations with paper to improve dielectric strength of the paper and other web materials.

They may be used for sound recording discs, tapes and magnetic tapes, i.e., sound or video tapes for general or computor use, particularly those types fabricated from one-way stretched film, asymmetrically two-way stretched or cross-laminated one-way stretched films.

They may be used for adhesive tapes, typewriter ribbons, textile threads, meteorological balloons, conveyor belting, book covers, as a release agent in moulding processes and parting sheets for low pressure laminating, for hot stamping foils, as mulches, for greenhouse glazing, and insulation and for glazing and insulation generally, e.g., as protective wrapping for rock wool insulation pads and bales, for concrete underlays and overlays, as temporary coverings in building operations, for acoustic tiles and pipe lagging, e.g., outside wrapping or inside liner for piping of all types, particularly plastic piping. They may be printed or dyed and may be laminated to glass and other films such as polythene, polyethylene terephthalate, polyvinyl chloride, and vinylidene chloride/vinyl chloride copolymers or to plastics generally and to rubbers. In particular, they may be used as safety-glass interlayers e.g. as an interlayer for laminating glass to glass or for laminating glass to polymethyl methacrylate; windows for containers and envelopes; transparent cans; container and bottle cap liners; laminations with metal foil to give metallic effects in fabrics; laminations with wood, paper or fabrics for pictures, book covers, wall protectors around light switches; wallpaper in clear, pigmented or printed form; millinery applications for example, in braid form either along or laminated to another film of a different colour; one-way stretched film for tear tapes for packages, e.g. cigarette packages; pressure sensitive tapes and adhesive tapes and transparent measuring tapes, particularly when made of one-way stretched film, asymmetrically two-way stretched film, or one-way stretched cross-laminated film.

Particularly when coated on one side only, they may also be used for drawing office purposes e.g. as tracing cloths after sand blasting or other abrasive treatment to give a rough surface, and for graphic arts and photographic films, for black and white or colour photography and as polarising film (when containing a dichroic dyestuff and uniaxially stretched) for car headlights and windshields.

The following miscellaneous uses may also be mentioned; as a plastic binder for strengthening non-woven fabrics; fabric replacement for garment bags, shoulder covers and the like; tubing for replacing metal tubing in various applications; protective devices such as face shields, goggles and the like, base film for metallising by vacuum deposition, sputtering or other techniques; ropes or belts fabricated by twisting and/or braiding ribbons or filaments; bacteriostatic applications for inhibiting mould growth, mildew or bacteria growth; barrier against diffusion of gases, e.g. as a barrier against diffusion of dichlorodifluomethane from refrigerator systems; as a base sheet for deep drawing or forming operations e.g. forming sheets into the shape of containers, dishes, plates and other hardware, cross-lamination of one-way stretched sheets employing a pigmented or coloured adhesive, the laminations being employed in window shades, awnings, tarpaulins and the like and various other specific applications such as playing cards, greeting cards, milk bottle hoods, drinking straws, tying ribbon, tracing cloth, display and picnic dishes, disposable protectors against war gases, showcase covers, ground-sheets for tents, tent and car windows and screens, printed charts, nomographs and scales, umbrellas, raincoats, file folders, refrigerator bags, tobacco pouches, drum heads, tops for convertible cars, car covers in shipment and storage, display card holders, ticker tape, protective covering for flash bulbs, bottle caps and window shades, heat shrinkable bands and applied in the form of a heat shrinkable film when this has not been heat set. They may be used as a base for abrasive articles such as sandpaper and emery paper after coating with an adherent coating containing the abrasive.

The invention is further illustrated by the following examples:

EXAMPLE 1

*Polypropylene film preparation and pretreatment.*—An isotactic polypropylene film (not more than 5% solubility in boiling n-heptane) which had been stretched 7X in the longitudinal and 7X in the lateral direction to biaxially orient it and then heat set at 150° C. for 0.25 min. was subjected to a corona discharge treatment which reduced its contact angle with water from about 90° to about 70°. The film was 0.0005 inch thick.

The corona discharge treatment was carried out by passing the polypropylene film over an 8-inch roller covered with a 0.024-inch thick dielectric of "Melinex" polyethylene terephthalate film at a rate of 20 ft./min. A corona discharge in air at 15,000 volts and 2,400 c.p.s. was applied to the film from three parallel 3 foot long electrodes along the length of the rollers.

*Film treatment.*—The above pretreated polypropylene film which had a contact angle of 70° was coated with the aforementioned urea formaldehyde resin solution to give coatings of the desired thickness and the coating was dried. The film was then overcoated with an aqueous dispersion of a vinylidene chloride/acrylonitrile copolymer (90/10 w./w.) stabilized by "Catanac" SN emulsifying agent (stearamido-propyl-dimethyl, $\beta$-hydroxy-ethyl-ammonium nitrate, 3% by weight on total weight) and contained 40% solids (w./w.) and ½% (by weight on total weight) of "Hoechst" wax C added as a slip agent. Coating was carried out on a laboratory coating frame using a wire wound glass rod to perform the coating. This frame did not permit shrinkage of the film on drying. The heat seals were made at 130° C./23 p.s.i. for 2 seconds with bar heat sealer ⅛ inch wide.

EXAMPLE 2

Polypropylene film was prepared and pretreated as in Example 1. It had a contact angle of 70° and was coated as in Example 1 on a laboratory coating frame with a solution of a urea formaldehyde condensate. The solution was in 1:1 (v./v.) xylene butanol diluted with methyl ethyl ketone and the urea-formaldehyde condensate had been modified by etherification with butanol to give about 35% (w./w.) of butoxy groups. The coating solution contained 50% solids when undiluted; methyl ethyl ketone was added to facilitate the production of the desired thicknesses of coating. The resin coating was dried as shown in Table I and was then overcoated with an aqueous dispersion of the vinylidene chloride copolymer used in Example 1 which was dried as shown in Table I. Heat seals were made at 130° C./23 p.s.i. for 2 seconds.

Table I

| Modified Urea-formaldehyde resin anchor coat | | | Overcoat | | | Seal Strength, g./inch |
|---|---|---|---|---|---|---|
| g./100 sq. cm. (thickness) | Drying Temp., °C. | Drying Time, Min. | Thickness, inch | Drying Temp., °C. | Drying Time, Min. | |
| | | | 7×10⁻⁵ | 120 | 2 | 110 |
| .0006 | 120 | 1.25 | 7×10⁻⁵ | 120 | 2 | 150 |
| .0012 | 120 | 1.25 | 7×10⁻⁵ | 120 | 2 | ² 250 |
| .0025 | 120 | 1.25 | 7×10⁻⁵ | 120 | 2 | ² 250 |
| .005 | 120 | 1.25 | 7×10⁻⁵ | 120 | 2 | ² 270 |
| .0094 | 120 | 1 | 7×10⁻⁵ | 120 | 2 | ² 270 |
| ¹.005 | 120 | 1.25 | 7×10⁻⁵ | 120 | 2 | 95 |

¹ A comparison run. Where the polypropylene film used had not been pretreated, otherwise as in this example. The coating could be stripped from the film in large pieces.
² Sample sheared during testing (film sheared near seal).

EXAMPLE 3

An isotactic polypropylene film (not more than 5% solubility in boiling n-heptane) which had been stretched 7 times in the longitudinal direction and 7 times in the lateral direction to biaxially orient it and then heat set at 130° C. for approximately six seconds, was subjected to a corona discharge treatment which reduced its contact angle with water from about 90° to about 70°. The film was 0.005 inch thick.

The corona discharge treatment was carried out by passing the polypropylene film over an 8 inch roller covered with a 0.024 inch thick dielectric or "Melinex" polyethylene terephthalate film at a rate of 20 ft./min. A corona discharge in air at 15,000 volts and 2,400 c.p.s. was applied to the film from three parallel 3-foot long electrodes along the length of the rollers. This treatment was applied to both sides of the film.

The above pre-treated polypropylene film was coated on both sides, by means of a gravure roll coating machine, with a solution of a butylated melamine-formaldehyde condensation product prepared in the following manner.

Formalin (36% aqueous formaldehyde solution) was mixed with butanol and the solvent distillate from a previous run and the pH adjusted to 5.5. Melamine was then added in amount such that there were present six moles of formaldehyde per mole of melamine and 4.4 moles of butanol per mole of melamine. The mixture was refluxed for one hour. After cooling, a small quantity of xylene was added to assist in subsequent water removal. Then water was removed over a period of 2¼ hours while solvent was distilled off to remove a fraction equivalent to the initial addition of distillate. Further xylene was added to adjust the solids content to 50%.

The condensation product was characterized by a petroleum ether tolerance as hereinbefore defined of 4. It had a viscosity of 28 seconds measured by the method of B.S. 1733 using a B.S./A 10 cup at 25° C.

The solution used for coating contained 20% solids and was prepared by diluting the condensation product, as prepared, with industrial methylated spirits so as to give a 30:11:9 by volume mixture of industrial methylated spirits, butanol and xylene. Sulphuric acid was then added to be present in an amount of 2.25% by weight of solids.

The coating applied to the first side was dried at 70° C. for approximately five seconds and that applied to the second side at 115° C. for approximately ten seconds. Each coating weighed 0.25 g./sq. metre of surface.

A top coat was simultaneously deposited on each side of the film by a nip roll coater using an aqueous dispersion of a vinylidene chloride/acrylonitrile copolymer (88/12 w./w.) stabilized by the hydrochloric acid salt of a condensation product of tallow amine (1 mole) and ethylene oxide (2 moles), using 4.7% by weight of resin solids of stabilizer. The dispersion contained 33% of copolymer solids and, in addition, 5.25% by weight on copolymer solids of colloidal sized particles of polyvinyl chloride in order to improve the slip properties of the coating. The top coat was dried by heating in an oven for approximately eight seconds at 120° C. Its thickness on each side was $7 \times 10^{-5}$ inch.

The coated film was wound into a roll and the seal strength and the coat adhesion of both the inside and the outside coatings of the wound film were tested as reported below, designated "IN" and "OUT" respectively. The heat seals were made at 130° C./5 p.s.i. for two seconds with a bar heat sealer one inch wide. The heat seal strengths (HSS) reported in g./in. were measured by peeling the sealed films apart to break the seal. The coat adhesion values (reported in g./in.) correspond to the loads required to continue stripping a 1 inch strip of coating from its base.

| Properties As Made | | Properties After 66 Hours at 38° C., 90% Relative Humidity | | Properties After 114 Hours at 38° C., 90% Relative Humidity | |
|---|---|---|---|---|---|
| HSS, In/Out | Coat Adhesion, In/Out | HSS, In/Out | Coat Adhesion, In/Out | HSS, In/Out | Coat Adhesion, In/Out |
| 190/210 | 80/130 | 190/170 | 100/135 | 135/205 | 75/130 |

A comparison of the product of this example with an otherwise identical product wherein similarly alkylated urea-formaldehyde was used in lieu of the alkylated melamine-formaldehyde showed that the melamine-formaldehyde embodiment demonstrated better strength and adhesion values on standing at high relative humidity (90%). Additionally, it was found that the alkylated melamine-formaldehyde coating could be effectively applied at a faster rate than the corresponding alkylated urea-formaldehyde coating.

EXAMPLE 4

A corona discharge treated film, exactly the same as that described in Example 3 except that the corona discharge was applied to one side only, was coated on the treated side with a 20% solids coating composition of melamine formaldehyde and butanol prepared in exactly the same way as in Example 3 and containing 2.25% by weight of sulphuric acid as in Example 3.

The coating was applied to one side only of the film and dried at 90° C. for approximately one minute. The coating weight was 0.25 g./sq. m. of surface.

A top coating was then applied on top of the anchor coat using an aqueous dispersion of vinyl chloride/vinyl acetate copolymer (containing 40% vinyl acetate) stabilized by 2.5% weight for weight of sodium tetradecyl sulphonate. The top coat was dried by heating in an oven for approximately a minute at 110° C. A coating weight of 3 g./sq. m. was obtained. A heat seal was made at 140° C. and 5 p.s.i. for two seconds with a bar heat sealer and the heat seal strength was 150 g./inch (measured in the same way as described in Example 1). After storing at 38° C. and 90% relative humidity for a week, the heat seal strength was still excellent.

EXAMPLE 5

A solution of butylated melamine formaldehyde condensation product was prepared in the manner described in Example 3 but using 5 moles of formaldehyde for each mole of melamine and 4 moles of butanol for each mole of melamine. The pH was adjusted to 4.5 The condensation product had a petroleum ether tolerance as hereinbefore defined of 26 and it had a viscosity of 60 seconds measured by the method of B.S. 1733 using a B.S./A 10 cup at 25° C. A coating solution was prepared from this product in the same way as described in Example 3 and applied to one side only of a corona discharge treated polypropylene film exactly the same as that described in Example 3 except that the corona discharge treatment was applied to one side only. The coating was dried at 70° C. for one minute and weighed 0.25 g./sq. m. of surface.

A top coat of vinyl chloride/acrylonitrile copolymer exactly the same as that described in Example 3 was applied and dried by heating in an oven at 110° C. for one minute. The top coating weight was 3 g./sq. m. The heat seal strength of seals made at 130° C. and 5 p.s.i. for 2 seconds was 330 g./inch.

EXAMPLE 6

A coating solution containing 10% weight for volume of the butylated melamine formaldehyde condensation product produced as described in Example 3 and 10% of a plasticizer comprising a coconut oil glycerol alkyd dissolved in methylated spirits/butanol/xylene (30:11:9) was used to coat a corona treated polypropylene film exactly the same as that described in Example 3. The anchor coat conditions for each side and the composition and method of applying the top coat were exactly the same as described in Example 3.

The coated film was wound onto a roller and the heat seal strength and coat adhesion of both the inside and outside coatings of the wound film were measured. The heat seal strengths were made at 130° C. and 5 p.s.i. for 2 seconds with a bar heat sealer one inch wide.

A heat seal strength of 180 g./inch was obtained for the "inside" coating and a heat seal strength of 225 g./inch was obtained for the "outside" coating.

The scope of the invention is defined in the following claims.

I claim:

1. A method of applying a heat-sealable coating to a film of an olefine polymer which comprises oxidizing the uncoated film surface to improve the bonding properties of said surface, coating the treated film with a dispersion of a thermosetting resin, said thermosetting resin being substantially insoluble in water and comprising an amine-formaldehyde condensate which has been etherified with an alkanol selected from the group consisting of $C_3$, $C_4$, $C_5$ and $C_6$ alkanols, evaporating off the dispersion medium, said thermosetting resin coating having a thickness corresponding at least to about 0.05 g./sq. meter of said uncoated film, overcoating the film with an aqueous dispersion of a heat-sealable coating material and applying sufficient heating to both dry the heat-sealable coating on the film and set the thermosetting resin so that it becomes adhesively bonded to the heat-sealable coating and to the base film.

2. A method according to claim 1 in which the coating of thermosetting resin is applied as a solution in an organic solvent.

3. A method according to claim 1 in which the film is oxidized by subjecting said film to a treatment by high voltage electric stress accompanied by corona discharge.

4. A method according to claim 3 in which the corona discharge is carried out to give a film to water contact angle of 65 to 75°.

5. A method according to claim 1 in which the amine-formaldehyde condensate is a butylated amine-formaldehyde condensate.

6. A method according to claim 1 in which, before applying the heat-sealable coating, the thermosetting resin is partially but not completely cured.

7. A method according to claim 1 in which the thermosetting resin is set in the presence of an acid catalyst.

8. A method according to claim 1 in which the heat-sealable coating material is a copolymer of vinylidene chloride and acrylonitrile.

9. A method of applying a heat-sealable coating to a film of an olefine polymer which comprises oxidizing the uncoated film surface to improve the bonding properties of said surface, coating the oxidized film with a dispersion of a thermosetting resin, said thermosetting resin being substantially insoluble in water and comprising an amine-formaldehyde condensate which has been etherified with an alkanol selected from the group consisting of $C_3$, $C_4$, $C_5$ and $C_6$ alkanols, evaporating off the dispersion medium, said thermosetting resin coating having a thickness corresponding at least to about 0.05 g./sq. meter of said uncoated film, overcoating the film with an aqueous emulsion of a heat-sealable coating material emulsified with a cationic surface-active agent and applying sufficient heating to both dry the heat-sealable coating on the film and set the thermosetting resin so that it becomes adhesively bonded to the heat-sealable coating and to the base film.

10. A method of applying a heat-sealable coating to a film of an olefine polymer, said film being oriented in at least one direction in the plane of the film, which comprises oxidizing the uncoated film surface to improve the bonding properties of said surface, coating the treated film with a dispersion of a thermosetting resin, said thermosetting resin being substantially insoluble in water and comprising an amine-formaldehyde condensate which has been etherified with an alkanol selected from the group consisting of $C_3$, $C_4$, $C_5$ and $C_6$ alkanols, evaporating off the dispersion medium, said thermosetting resin coating having a thickness corresponding at least to about 0.05 g./sq. meter of said uncoated film, overcoating the film with an aqueous dispersion of a heat-sealable coating material and applying sufficient heating to both dry the heat-sealable coating on the film and set the thermosetting resin so that it becomes adhesively bonded to the heat-sealable coating and to the base film.

11. A heat-sealable coated film which comprises a base film comprising an olefine polymer, a top coat comprising a heat-sealable polymeric material, said top coat being anchored to said base film by means of an intermediate layer of a thermoset resin comprising a cured, etherified amine-formaldehyde condensate wherein the ether groups in said condensate are derived from an alkanol selected from the group consisting of $C_3$, $C_4$, $C_5$ and $C_6$ alkanols, said thermosetting resin coating having a thickness corresponding at least to about 0.05 g./sq. meter of said uncoated film.

12. A heat-sealable coated film according to claim 11 in which said base film is oriented in at least one direction in the plane of the film.

13. A heat-sealable coated film according to claim 11 in which said base film is biaxially oriented polypropylene film.

14. A heat-sealable coated film which comprises a base film comprising an olefine polymer, a top coat comprising a heat-sealable polymeric material, said top coat being anchored to said base film by means of an intermediate layer of a thermoset resin comprising a cured, etherified urea-formaldehyde condensate wherein the ether groups in said condensate are derived from an alkanol selected from the group consisting of $C_3$, $C_4$, $C_5$ and $C_6$ alkanols, said thermosetting resin coating having a thickness corresponding at least to about 0.05 g./sq. meter of said uncoated film.

15. A method of applying a heat-sealable coating to a film of an olefine polymer which comprises oxidizing the uncoated film surface to improve the bonding properties of said surface, coating the treating film with a dispersion of a thermosetting resin, said thermosetting resin being substantially insoluble in water and comprising a melamine-formaldehyde condensate which has been etherified with an alkanol selected from the group consisting of $C_3$, $C_4$, $C_5$ and $C_6$ alkanols, evaporating off the dispersion medium, said thermosetting resin coating having a thickness corresponding at least to about 0.05 g./sq. meter of said uncoated film, overcoating the film with an aqueous dispersion of a heat-sealable coating material and applying sufficient heating to both dry the heat-sealable coating on the film and set the thermosetting resin so that it becomes adhesively bonded to the heat-sealable coating and to the base film.

16. A method according to claim 15 wherein said condensate is a butylated melamine-formaldehyde condensate.

17. A heat-sealable coated film which comprises a base film comprising an olefine polymer, a top coat comprising a heat-sealable polymeric material, said top coat being anchored to said base film by means of an intermediate layer of a thermoset resin comprising a cured, etherified melamine-formaldehyde condensate wherein the ether groups in said condensate are derived from an alkanol selected from the group consisting of $C_3$, $C_4$, $C_5$ and $C_6$ alkanols, said thermosetting resin coating having a thickness corresponding at least to about 0.05 g./sq. meter of said uncoated film.

References Cited by the Examiner

UNITED STATES PATENTS

| | | | |
|---|---|---|---|
| 2,280,829 | 4/1942 | Jebens | 117—76 X |
| 2,626,876 | 1/1953 | Carnes | 117—138.8 |
| 2,653,113 | 9/1953 | Banigan | 117—138.8 |
| 2,673,826 | 3/1954 | Ness | 117—138.8 X |
| 2,684,919 | 7/1954 | Berry et al. | 117—76 |
| 2,688,570 | 9/1954 | Wooding | 117—76 |
| 2,688,571 | 9/1954 | Wooding | 117—76 |
| 2,717,843 | 9/1955 | Vitalis | 117—156 |
| 2,719,798 | 10/1955 | Wooding et al. | 117—76 |
| 2,752,266 | 6/1956 | Hofrichter et al. | 117—76 |
| 2,763,571 | 9/1956 | Wooding et al. | 117—76 X |
| 2,830,721 | 4/1958 | Pinsky et al. | |
| 2,897,100 | 7/1959 | Grenley et al. | 117—138.8 |
| 2,998,324 | 8/1961 | Hirt | 117—138.8 |
| 3,022,543 | 2/1962 | Baird et al. | 117—138.8 X |
| 3,023,126 | 2/1962 | Underwood et al. | 117—138.8 X |
| 3,031,332 | 4/1962 | Rothaker | 117—138.8 |
| 3,041,208 | 6/1962 | Hay et al. | 117—138.8 |
| 3,057,752 | 10/1962 | Covington et al. | 117—138.8 X |
| 3,070,462 | 12/1962 | McConnell et al. | 117—138.8 |
| 3,088,844 | 5/1963 | Hungerford et al. | 117—138.8 |

FOREIGN PATENTS

| | | |
|---|---|---|
| 224,957 | 8/1959 | Australia. |
| 592,851 | 2/1960 | Canada. |
| 823,753 | 11/1959 | Great Britain. |

WILLIAM D. MARTIN, *Primary Examiner.*

W. D. HERRICK, *Assistant Examiner.*